US007979832B2

(12) United States Patent
Jung et al.

(10) Patent No.: US 7,979,832 B2
(45) Date of Patent: Jul. 12, 2011

(54) PROCESS VARIATION TOLERANT MEMORY DESIGN

(75) Inventors: Seong-Ook Jung, Goyang-si (KR); Sei Seung Yoon, San Diego, CA (US); Hyunwoo Nho, Stanford, CA (US)

(73) Assignee: QUALCOMM Incorporated, San Diego, CA (US)

( * ) Notice: Subject to any disclaimer, the term of this patent is extended or adjusted under 35 U.S.C. 154(b) by 693 days.

(21) Appl. No.: 11/873,638

(22) Filed: Oct. 17, 2007

(65) Prior Publication Data

US 2008/0141190 A1  Jun. 12, 2008

Related U.S. Application Data

(60) Provisional application No. 60/868,900, filed on Dec. 6, 2006.

(51) Int. Cl.
    G06F 17/50 (2006.01)
    G06F 9/455 (2006.01)
(52) U.S. Cl. .......................... 716/134; 716/113; 716/100
(58) Field of Classification Search .................. 716/100, 716/105, 110, 113, 131–132, 134–135
    See application file for complete search history.

(56) References Cited

U.S. PATENT DOCUMENTS

| 5,438,527 A | 8/1995 | Feldbaumer |
| 6,584,036 B2* | 6/2003 | Kurjanowicz et al. ... 365/233.11 |
| 7,505,345 B2* | 3/2009 | Wang et al. .................. 365/207 |
| 2002/0131320 A1* | 9/2002 | Kurjanowicz et al. ........ 365/233 |
| 2004/0122642 A1 | 6/2004 | Scheffer |
| 2006/0095888 A1 | 5/2006 | Li et al. |
| 2006/0203581 A1 | 9/2006 | Joshi et al. |
| 2008/0071511 A1* | 3/2008 | Lin ................................... 703/14 |
| 2008/0106963 A1* | 5/2008 | Wang et al. .................... 365/207 |
| 2009/0310430 A1* | 12/2009 | Chuang et al. ................ 365/201 |

OTHER PUBLICATIONS

Mukhopadhyay S. et al.; "Modeling of Failure Probability and Statistical Design of SRAM Array for Yield Enhancement in Nanoscaled CMOS"; IEEE Transactions on Computer-Aided Design of Integrated Circuits and Systems; IEEE USA, vol. 24, No. 12, Dec. 2005; pp. 1859-1880; XP002476433; ISSN: 0278-0070.
Heald, R. et al.; "Variability in sub-100nm SRAM Designs"; Computer Aided Design, 2004; ICCAD-2004; IEEE/ACM International Conference on San Jose, CA, USA; Nov. 7-11, 2004; Piscataway, NJ, USA; IEEE; Nov. 7, 2004, pp. 347-352; XP010763285; ISBN: 0-7803-8702-3.
Bharadwaj, S. Amrutur et al; A Replica Technique for Wordline and Sense Control in Low-Power SRAM'S; IEEE Journal of Solid-State Circuits, IEEE Service Center, Piscataway, NJ, USA; vol. 33, No. 8; Aug. 1998, XP011060780; ISSN: 0018-9200.
Simon, J. Lovett et al.; "Yield and Matching Implications for Static RAM Memory Array Sense-Amplifier Design"; IEEE Journal of Solid-State Circuits, IEEE Service Center, Piscataway, NJ, US; vol. 35, No. 8; Aug. 2000; XP011061307; ISSN: 0018-9200.
International Search Report—PCT/US07/086249, International Search Authority—European Patent Office—May 14, 2008.

(Continued)

*Primary Examiner* — Stacy A Whitmore
(74) *Attorney, Agent, or Firm* — Sam Talpalatsky; Nicholas J. Pauley; Jonathan T. Velasco

(57) ABSTRACT

Methods and systems for designing process variation tolerant memory are disclosed. A memory circuit is divided into functional blocks. A statistical distribution is calculated for each of the functional blocks. Then, the distributions of each block are combined to verify a credibility of the circuit. The credibility is verified if the circuit meets a predetermined yield.

19 Claims, 7 Drawing Sheets

OTHER PUBLICATIONS

Peng, Tao; "How Much Mismatch Should Be Simulated in the High Density SRAM Sense Amplifier Design", Reliability Physics Symposium, 2005 Proceedings, 43rd Annual. 2005 IEEE International San Jose, CA, USA Apr. 17-21, 2005, Piscataway, NJ, USA, IEEE, (Apr. 17, 2005), pp. 672-673, XP010827010.

Written Opinion—PCT/US07/086249, International Search Authority—European Patent Office—May 14, 2008.
H. Nho et al., Statistical simulation methodology for sub-100nm memory design, Electronic Letters, Aug. 8, 2007, vol. 43, No. 16.

* cited by examiner

Comparison of 3-sig and 4-sig points

PROCESS VARIATION TOLERANT MEMORY DESIGN

CLAIMS OF PRIORITY UNDER 35 U.S.C. §119

The present Application for Patent claims priority to Provisional Application No. 60/868,900 entitled "Process Variation Aware Memory Design Methodology" filed Dec. 6, 2006, and assigned to the assignee hereof and hereby expressly incorporated by reference herein.

FIELD OF DISCLOSURE

Embodiments of the invention are related to semiconductor design. More particularly embodiments of the invention are related to memory design methods and systems.

BACKGROUND

Process technology scaling has helped in the realization of System on Chips (SoCs) that include many types of cores to implement complex functionalities.

According to the International Technology Roadmap for Semiconductor (ITRS), memory occupies an increasingly large portion of these SoCs and this trend is anticipated to continue. Various memory types such as SRAM, DRAM, and/or Flash memory have been embedded in SoCs. SRAM is a dominant embedded memory since it can be easily integrated with standard CMOS process technology.

Process technology scaling increases process variations due to random doping fluctuation, well proximity effect (WPE), and gate line edge roughness (LER). The process variations cause significant variations in circuit characteristics and make it difficult to model the behavior of the overall circuit. Therefore, due to the increased processing variation, estimating circuit performance is becoming very important at sub-100 nm process nodes. Excessively conservative design margins will increase complexity, design effort, and cost. On the other hand, underestimation of the process variation will lead to compromised performance or even functional failure.

Process variations can be generally divided into two categories: inter-die variation and intra-die variation. With the inter-die variation, the process parameters of all transistors in a die are shifted to one direction the same amount. The conventional design corner simulation methodology (i.e., slow, typical, and fast) can cover such a concurrent shift. On the other hand, the intra-die variation can cause process parameter shifts to vary in different directions for each transistor in a die, which results in process parameter mismatches between transistors. Thus, statistical simulation can be used to characterize the intra-die variation. The intra-die variation includes systematic variation and random variation. Threshold voltage ($V_T$) mismatch due to random doping fluctuation is the significant source of the random variation. Since a limited number of dopant atoms are in the extremely small MOSFET channel area in nanoscaled process technology, the random doping fluctuation results in severe threshold variations which become a significant portion of the intra-die variations.

The threshold voltage mismatch is inversely proportional to the square root of the transistor area (width x length). Since memory cell size has been reduced with technology scaling to keep a high array efficiency, the threshold voltage mismatch has become a challenging issue in memory design. Memory failures according to the process variations can be generally categorized into 1) read stability failure, 2) write failure, 3) hold failure and 4) read access failure. The read stability failure and the hold failure can be considered to be due mainly to the threshold voltage mismatches between transistors in a memory cell. The write failure can be caused by the threshold voltage mismatch in a cell and a narrow wordline pulse width.

Variation in average bitcell read current ($I_{AVG}$), variation in sense amplifier enable time ($t_{SAE}$), and sense amplifier offset voltage ($V_{OS\_SA}$) are involved in the read access failure. A read access failure probability model is outlined in S. Mukhopadhyay, et al., "Modeling of Failure Probability and Statistical Design of SRAM Array for Yield Enhancement in Nanoscaled CMOS", IEEE Trans. On Computer-Aided Design of Integrated Circuits and Systems, vol. 24, no. 12, pp. 1859-1880, December 2005, which is incorporated herein in its entirety. The model proposed used a fixed $V_{OS\_SA}$, thereby ignoring the statistical distribution of $V_{OS\_SA}$. Additionally, variation in the $t_{SAE}$ was not considered. The distributions of $t_{SAE}$ and $V_{OS\_SA}$ were described in R. Heald et al., "Variability in Sub-100 nm SRAM Designs", IEEE/ACM Int. Con. on Computer Aided Design, pp. 347-352, Nov. 12, 2004, which is incorporated herein in its entirety. However, the statistical distributions of $I_{AVG}$, $t_{SAE}$, and $V_{OS\_SA}$ have not been used in combination to optimize the memory architecture.

Sense amplifier optimization with the statistical simulation was emphasized to increase sensing margin by B. Amrutur et al., "A Replica Technique for Word Line and Sense Control in Low-Power SRAMs", IEEE Journal of Solid State Circuits, vol. 33, no. 8, pp. 1208-1219, August 1998, which is incorporated herein by referenced in its entirety. The proper number of standard deviation of the threshold voltage mismatch according to the number of sense amplifiers was proposed to achieve high yield for sense amplifier in an article by S. Lovett et al., "Yield and Matching Implications for Static RAM Memory Array Sense-Amplifier Design", IEEE Journal of Solid-State Circuits, vol. 35, no. 8, pp. 1200-1204, August 2000, which is incorporated herein by referenced in its entirety. The yield estimation model with the standard deviation of threshold voltage was presented in an article by T. Peng, "How much Mismatch Should be Simulated in the High Density SRAM Sense Amplifier Design", IEEE Annual. Int. Reliability Physics Sym., pp. 672-673, April 2005, which is incorporated herein by referenced in its entirety.

Although individual aspects of process variation in memory design have been analyzed, the conventional methods fail to combine the variation in bitcell read current, the variation in the delay of the bitline tracking path which enables sense amplifier, and the sense amplifier offset voltage to achieve process variation tolerant memory designs and design methods for process variation tolerant memory designs

SUMMARY

Exemplary embodiments of the invention are directed to systems and methods for process variation tolerant memory designs with process variations in deep submicron technology.

Accordingly, an embodiment of the invention can include a method for designing memory comprising: dividing a circuit into functional blocks; determining a statistical distribution for each of the functional blocks, wherein the statistical distribution is based on process variation parameters; and combining the statistical distributions of each block to verify a credibility of the circuit, wherein the credibility is verified if the circuit meets a desired yield.

Another embodiment of the invention can include, a computer readable media embodying a method for designing process variation tolerant memory, the method comprising:

dividing a circuit into functional blocks; determining a statistical distribution for each of the functional blocks, wherein the statistical distribution is based on process variation parameters; and combining the statistical distributions of each block to verify a credibility of the circuit, wherein the credibility is verified if the circuit meets a desired yield.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the terms "embodiments" and "embodiments of the invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments of the invention including a systematic SRAM design methodology to achieve a desired yield for memory read access are discussed herein. However, those skilled in the art will appreciate that embodiments are also applicable to other memory designs such as DRAM and Flash memory. Embodiments combine the three read access failure components together, to accurately estimate the yield of given design. Embodiments can be applied to optimize the memory architecture, the bitline tracking scheme, the read access time, the sense amplifier size, and the yield in early design stages.

Figure 1:
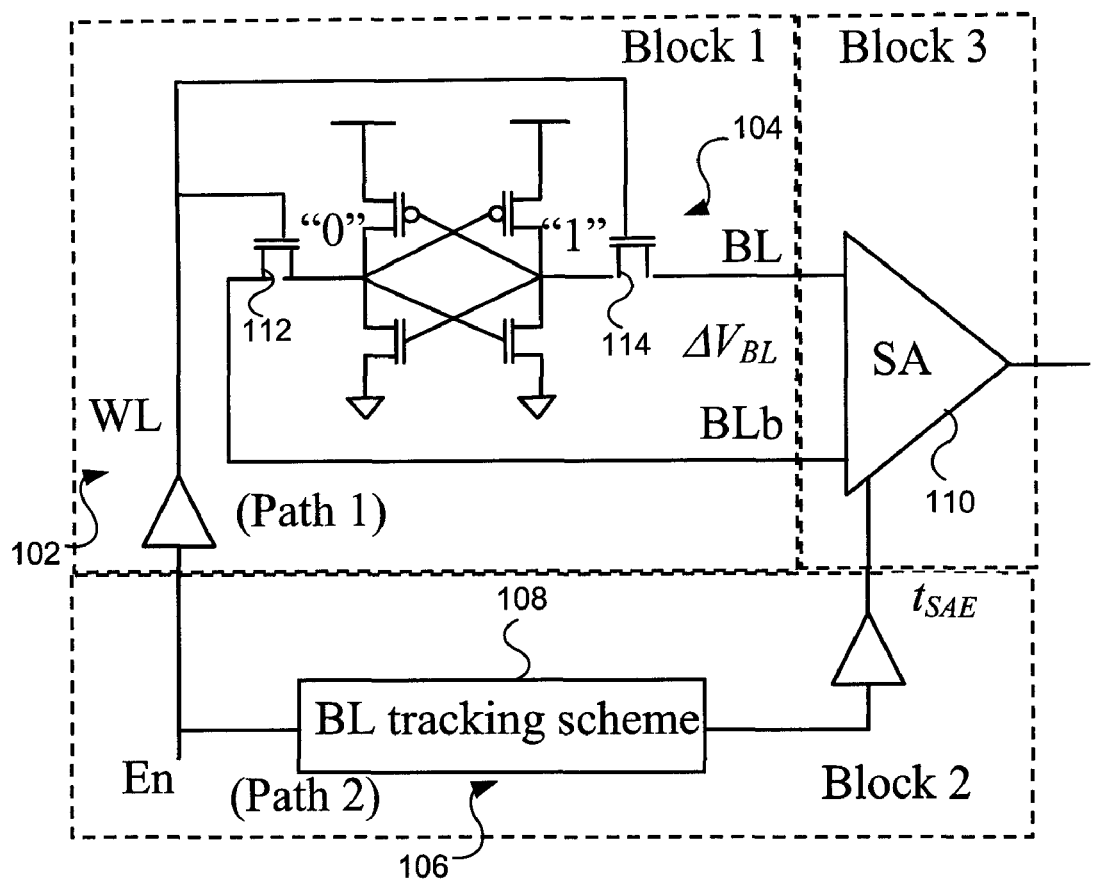
FIG. 1 is a block diagram of a read circuit of a static random access memory (SRAM).

SRAM conventionally includes multiple sub-arrays (banks) to achieve the desired design performance and power targets. Each sub-array has a similar structure except sub-array unique circuitry such as a sub-array selection circuit. Blocks for the SRAM read operation in a sub-array are illustrated in FIG. 1. Block1 includes a sub-array enable to wordline enable path 102 and wordline enable to bitline separation path 104. Block2 includes a sub-array enable to sense amplifier enable path 106 through a bitline tracking scheme 108. Block3 is a sense amplifier 110. For the read operation, the bitline separation (Block1) at the sense amplifier enable time (Block2) should be greater than the sense amplifier offset (Block3). Thus, each block plays a role in the SRAM read operation.

Bitline separation voltage (also referred herein as "bitline separation") is very sensitive to the transistor variations because conventionally only two transistors (pass and pull-down transistors 112, 114 of the cell) are involved in the path from wordline enable to bitline separation. The process variation also can be detrimental to the sense amplifiers (e.g., 110) as the sense amplifiers are theoretically designed to be a perfectly-balanced and symmetrical circuit. With a high incidence of transistor mismatches at sub-100 nm technology, input-referred sense amplifier offset is becoming a serious problem in circuit design. Similarly, uncertainty in tracking the path delay can detrimentally affect not only the performance, but also the functionality of the memory.

Figure 2:
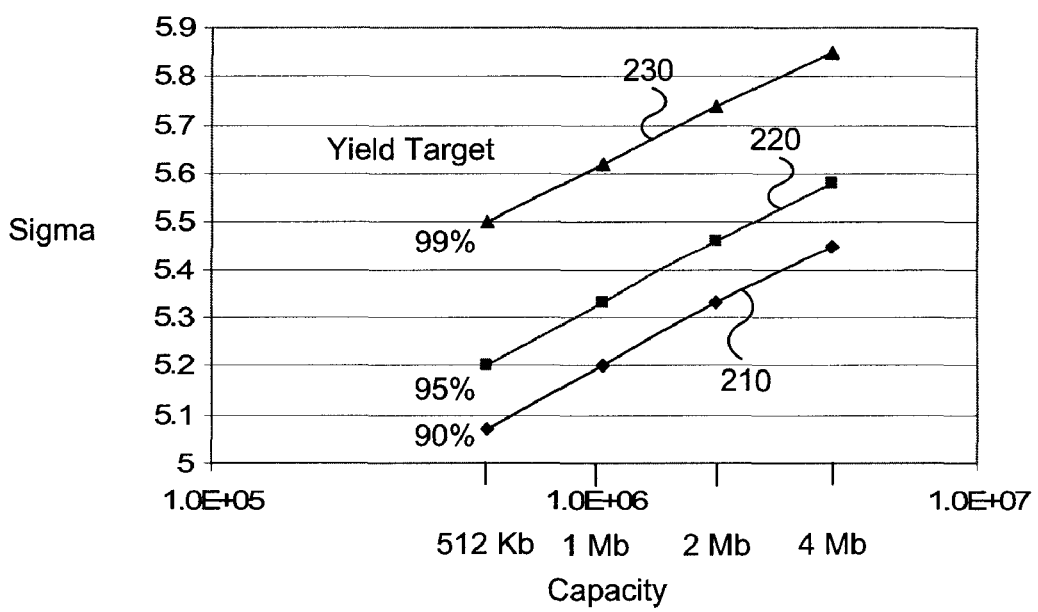
FIG. 2 is a graph illustrating sigma of the process vs. memory size to achieve a target yield.

FIG. 2 illustrates sigma credibility for different capacities of embedded memories. For example, in order for a 1 Mb embedded memory to have 90% yield, one read-out operation should have at least 5.2 sigma credibility. This increases to 5.33-sigma if the capacity is increased to 2 Mb, as illustrated in FIG. 2. In FIG. 2, sigma versus memory size is plotted for target yields of ninety percent, 210, ninety-five percent, 220 and ninety-nine percent, 230. Discrete points are illustrated for 512 Kb, 1 Mb, 2 Mb, and 4 Mb memory sizes. Generally, as use herein, sigma credibility or credibility refers to the ability of a design to achieve a desired or targeted yield.

Embodiments of the invention include statistical simulation methods that provide fast and accurate estimation of the yield for a given circuit design. A Monte Carlo model, which models both inter-and intra-die process variations, can be used to capture the transistor mismatch problem occurring in sub-100 nm technology nodes (see, e.g., S. Mukhopadhyay discussed in the Background). Enhanced accuracy is achieved by utilizing the information extracted from the shape of the resulting Monte Carlo distributions, as opposed to the conventional method that only focuses on the single worst point. Accordingly, embodiments of the invention offer fast and efficient system level yield estimations by breaking down the overall system into small circuit level blocks (e.g., bitcell, bitline tracking path, and sense amplifier) and running Monte Carlo simulations for the blocks. Then, the results of the simulations are combined. For purposes of illustration, embodiments are compared with conventional fixed-corner simulation methods.

A conventional fixed-corner simulation method is to apply a fixed design corner model, based on inter-die process variation, to all the transistors in a design. In addition, $V_{dd}$ and temperature are separately chosen according to the design objectives such as performance, setup time, hold time, active and leakage power consumption. For example, the SSSS corner (slow NMOS; slow PMOS; slow temp; low $V_{dd}$) is conventionally used for performance verification of the critical path. It represents the worst condition for each component, and therefore a design passing such extreme performance constraints is considered to meet the timing constraints specifications.

However, since the fixed-corner simulation does not include the intra-die variation, such an approach does not represent a confident worst-case in sub-100 nm memory design due to the significance of mismatch in scaled down devices. Note that two different signal paths are involved for proper data sensing in SRAM (see, e.g., FIG. 1). Path1 is from sub-array enable to bitline discharge (with bitline separation of $\Delta V_{BL}$) and Path2 is from sub-array enable to sense amplifier enable (which fires at $t_{SAE}$). Assuming $\Delta V_{BL\_MIN}$ is required for correct sensing, $t_{SAE}$ is carefully designed to satisfy $\Delta V_{BL}[@t_{SAE}] \geq \Delta V_{BL\_MIN}$. If intra-die process variation is considered, the true worst case happens when Path1 is slow and Path2 is fast. This skew shortens the discharge time and eventually reduces the bitline separation needed for correct data sensing. A simple design corner simulation in the conventional method cannot capture this.

Figure 3:
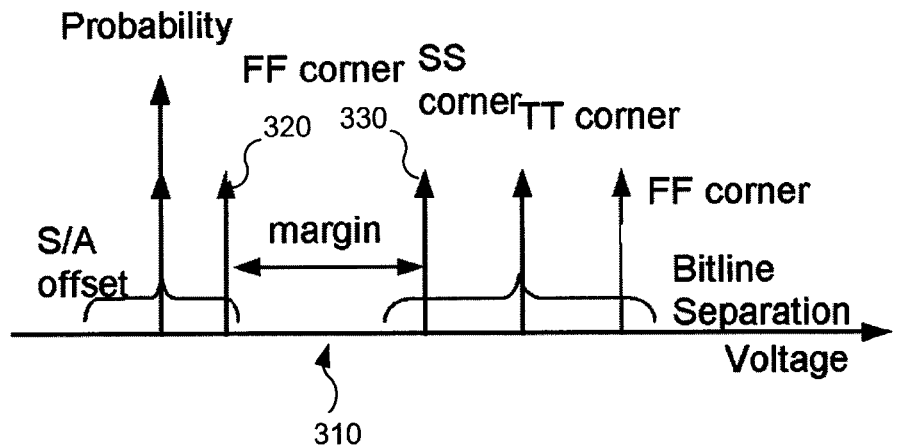
FIG. 3 is a graph illustrating a fixed-corner analysis of sense amplifier offset and bitline separation distributions.

Choosing different corners for each path, such as a slow corner (SS) 330 for Path1 (bitline separation) and a fast corner (FF) 320 for Path2 (sense amplifier offset), and making sure $\Delta V_{BL}[@t_{SAE}] \geq \Delta V_{BL\_MIN}$ could be one way to ensure read failure does not happen (see, e.g., FIG. 3). The design margin 310 is then simply the separation of the fast corner 320 and the slow corner 330. However, as transistor mismatches increase in sub-100 nm technology nodes, this method will result in an extremely conservative design and can seriously compromise the performance achieved in practice.

The fixed-corner simulation has the following limitations. First, it cannot simulate the real worst-case combination of SRAM in sub-100 nm designs where transistor variations become a significant factor. Second, it is not suitable for yield estimation of embedded memory, where sigma credibility is not only dependent on the yield requirement but also the capacity of the memory (see, e.g., FIG. 2).

A Monte Carlo model can generate the random variation of device characteristics for every iteration as opposed to the fixed-corner model where it sets the upper and lower bound. Thus, Monte Carlo simulation results show the distributions of the circuit characteristics. However, fixed-corner simulation can generate either optimistic results or pessimistic results, since it assumes the worst skew for all the transistors. Optimistic results are obtained in SRAM read paths with the fixed-corner simulation since both the bitcell read current and bitline tracking path are skewed to one direction which results in a larger $\Delta V_{BL}$. The fixed-corner simulation for a simple inverter chain shows a pessimistic result since it does not account for the averaging-out effect of the delay distributions across the inverters. Monte Carlo simulation can be a powerful tool, because it can model both inter-die and intra-die variations and the resulting distributions provide more information about the trend of failure probability.

Despite its advantages, there are several problems in applying Monte Carlo simulation techniques to SRAM. First, a major drawback of Monte Carlo simulation is its long computation time. The computations become exponentially complicated when many transistors and parameters are involved in the simulation. For example, 5.2 sigma credibility is used for a 1 Mb embedded memory to have a gross yield of 90%. (see, e.g., FIG. 2) This is equivalent to a failure rate of 0.1 ppm. That means more than 10 million iterations should be tried to find one failure, and the total computation time will be unacceptably long. In addition, it is unclear how to combine the distributions when multiple circuit blocks are involved. In a SRAM, bitline separation will have a distribution of its own, and sense amplifiers will also have a distribution of offsets.

One simple method is to run a Monte Carlo simulation of the whole system repeatedly until the failure rate is determined, so that there is no concern with regard to the distribution of the intermediate nodes. However, this whole system simulation is impractical because of the time and resources such a simulation will require.

Embodiments of the invention can take advantage of Monte Carlo simulations without the burden of excessive computational complexity. For example, for computational efficiency, embodiments can divide the analyzed path into the following blocks and focus on each block separately: (i) bitline separation variation; (ii) tracking path delay (sense amplifier enable time ($t_{SAE}$)) variation; and (iii) sense amplifier offset variation. The statistical distributions of each block can be combined to estimate the credibility of the overall system. Accordingly, the following description addresses variation in average bitcell read current ($I_{AVG}$) and consequent variation in $\Delta V_{BL}$, variation in sense amplifier enable time ($t_{SAE}$), and sense amplifier offset voltage ($V_{OS\_SA}$) which can be involved in the read access failure due to process variations, such as threshold voltage ($V_T$) mismatch.

The bitline separation can be expressed using an alpha-power model given as:

$$\Delta V_{BL} = \frac{\int_0^t i \, dt}{C_{BL}} = \frac{I_{AVG} \cdot t}{C_{BL}} \alpha \frac{(V_{DD} - V_t)^\alpha \cdot t}{C_{BL}}. \tag{1}$$

Where $V_{DD}$ is the power supply voltage, $C_{BL}$ is the bitline capacitance, $\alpha$ is the carrier velocity saturation index (generally ranging from 1 to 2, e.g., $\alpha=2$ for long channel devices and $\alpha \sim 1.3$ for short channel devices) and t is the bitline discharge time. $V_T$ distribution is mainly due to random doping fluctuation and is given by a Gaussian distribution (see, e.g., A. Asenov et al., "Simulation of Intrinsic Parameter Fluctuations in Decananometer and Nanometer-scale MOSFETs", IEEE Trans. On. Electron Devices, vol. 50, no. 9, September 2003, which is incorporated by reference in its entirety). Accordingly, $I_{AVG}$ and the $\Delta V_{BL}$ can also be modeled by Gaussian distributions, as follows:

$$\Delta V_{BL} \sim N_I(\mu_{\Delta V_{BL}}, \sigma_{\Delta V_{BL}}^2), I_{AVG} \sim N_I(\mu_{I_{AVG}}, \sigma_{I_{AVG}}^2). \tag{2}$$

In the foregoing equation, $\mu_X$ is the mean of X and $\sigma_X$ is the standard deviation of X Accordingly, $\mu_{\Delta V_{BL}}$ is the mean of the bitline separation ($\Delta V_{BL}$) and $\sigma_{I_{AVG}}$ is the standard deviation of the average bitcell read current ($I_{AVG}$). Since the t and the $C_{BL}$ are independent of $I_{AVG}$, the following equations hold.

$$\mu_{\Delta V_{BL}} = \frac{t}{C_{BL}}\mu_{I_{AVG}}, \sigma^2_{\Delta V_{BL}} = \frac{t}{C_{BL}}\sigma_{I_{AVG}} \quad (3)$$

Figure 4:
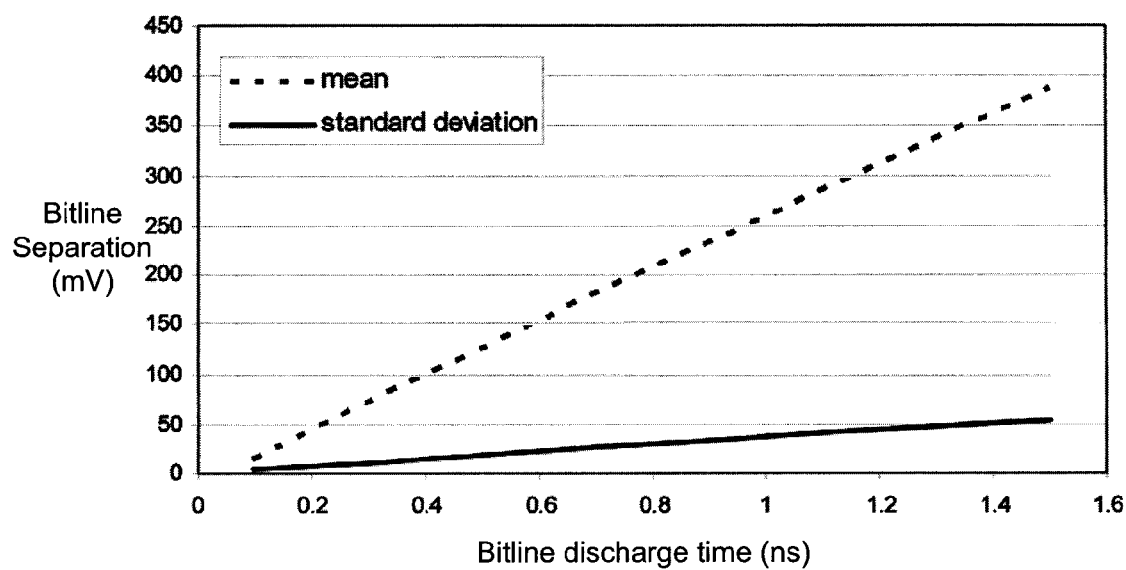
FIG. 4 is a graph illustrating mean and standard deviation of bitline separation voltage versus bitline discharge time.

These generally linear relationships are easily observed in the simulation results shown in the graph of FIG. 4. In FIG. 4, the graph illustrates the mean and standard deviation of the bitline separation as a function of bitline discharge time (e.g., $t_{SAE}$). In addition, since the tracking path conventionally includes logic gates and tracking bitcells, the $t_{SAE}$ distribution can be modeled by a Gaussian distribution (see, e.g., M. Eisele et al., "The Impact of Intra-Die Device Parameter Variations on Path Delays and on the Design for Yield of Low Voltage Digital Circuits", IEEE Trans. On Very Large Scale Integration System, Vol. 5, No. 4, pp. 360-368, December 1997, which is incorporated by reference herein in its entirety). Consequently, the $\Delta V_{BL}$ distribution is obtained by combining the distributions of $I_{AVG}$ and $t_{SAE}$ and which results in the following.

$$\Delta V_{BL} \sim N_V[\mu_{\Delta V_{BL}}\{N_t(\mu_{t_{SAE}}, \sigma_{t_{SAE}}^2)\}, \sigma_{\Delta V_{BL}}^2\{N_t(\mu_{T_{SAE}}, \sigma_{t_{SAE}}^2)\}]. \quad (4)$$

To obtain the $\Delta V_{BL}$ distribution, random values for $t_{SAE}$ are generated that fit the distributions $N_t(\mu_{t_{SAE}}, \sigma_{t_{SAE}}^2)$. Each value is plugged into the mean and the standard deviation equations extracted from FIG. 4 to find $\mu_{\Delta V_{BL}}$ and $\sigma_{\Delta V_{BL}}$. The obtained $\mu_{\Delta V_{BL}}$ and $\sigma_{\Delta V_{BL}}$ can then be plugged into $N_V$ to generate a single random value, $\Delta V_{BL}$. This process can be repeated multiple times to achieve the overall distribution of the functional blocks and system.

Figure 5A:
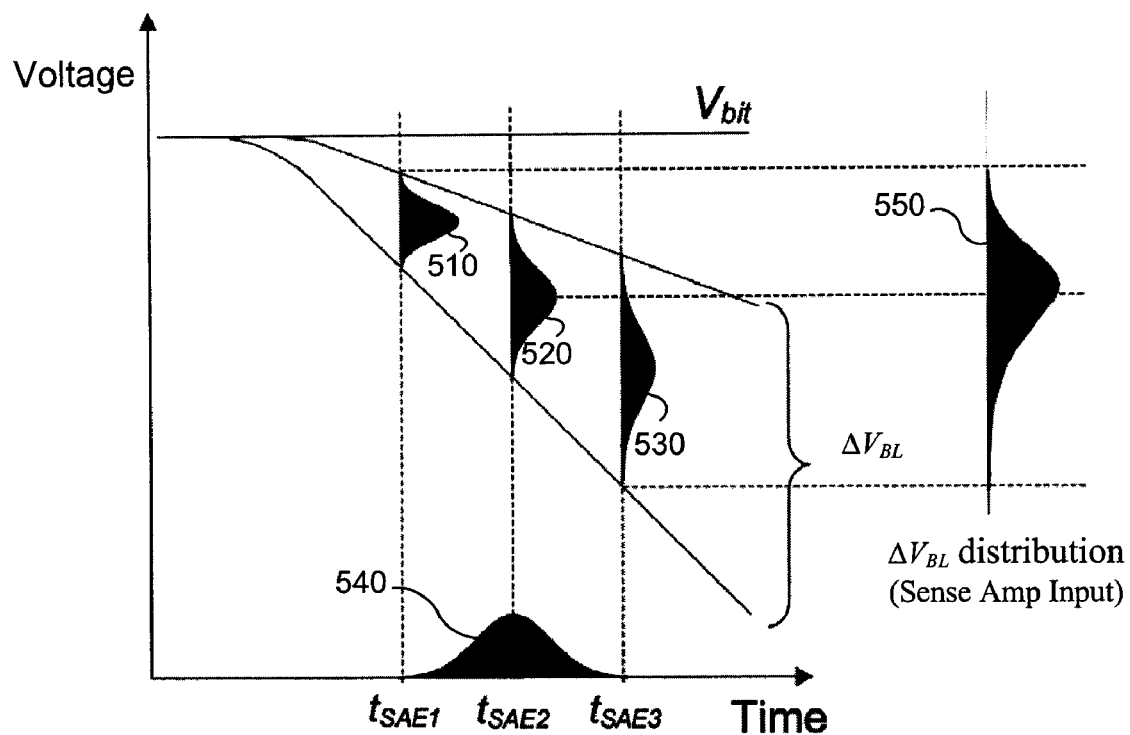
FIGS. 5A and 5B is a graph illustrating a real distribution of voltage and an ideal distribution of voltage at the sense amplifier input, respectively.

FIG. 5A is a graph illustrating the bitline voltage distribution for a Gaussian distribution of the sense amplifier enable time ($t_{SAE}$). FIG. 5A illustrates that $\Delta V_{BL}$ forms a skewed Gaussian distribution 550. The skew results from the variation of the sense amplifier enable time (e.g., $t_{SAE1}$, $t_{SAE2}$, and $t_{SAE3}$), which forms a first distribution 540. The sense amplifier enable time variation also impacts the variation of bitline voltage (e.g., 510, 520, and 530). Generally, the bitline separation shows increasing mean and standard deviation (e.g., 530) as the sense amplifier enable time increases (e.g., $t_{SAE3}$) during a read operation. The resulting combination of distributions result in the skewed Gaussian distribution of the bitline voltage separation $\Delta V_{BL}$. Both bitline separation (510, 520, and 530) and tracking path delay (540) are assumed to be Gaussian for purposes of illustration. The mean ($t_{SAE}$) and standard deviation ($t_{SAE}$) are functions of tracking scheme delay (see, e.g., FIG. 4). Accordingly, input voltage at the sense amplifier (e.g., 550) is a both a function of the distribution of the bitline separation (e.g., 510, 520 and 530) and the distribution of the sense amplifier enable time (e.g., 540).

Figure 5B:
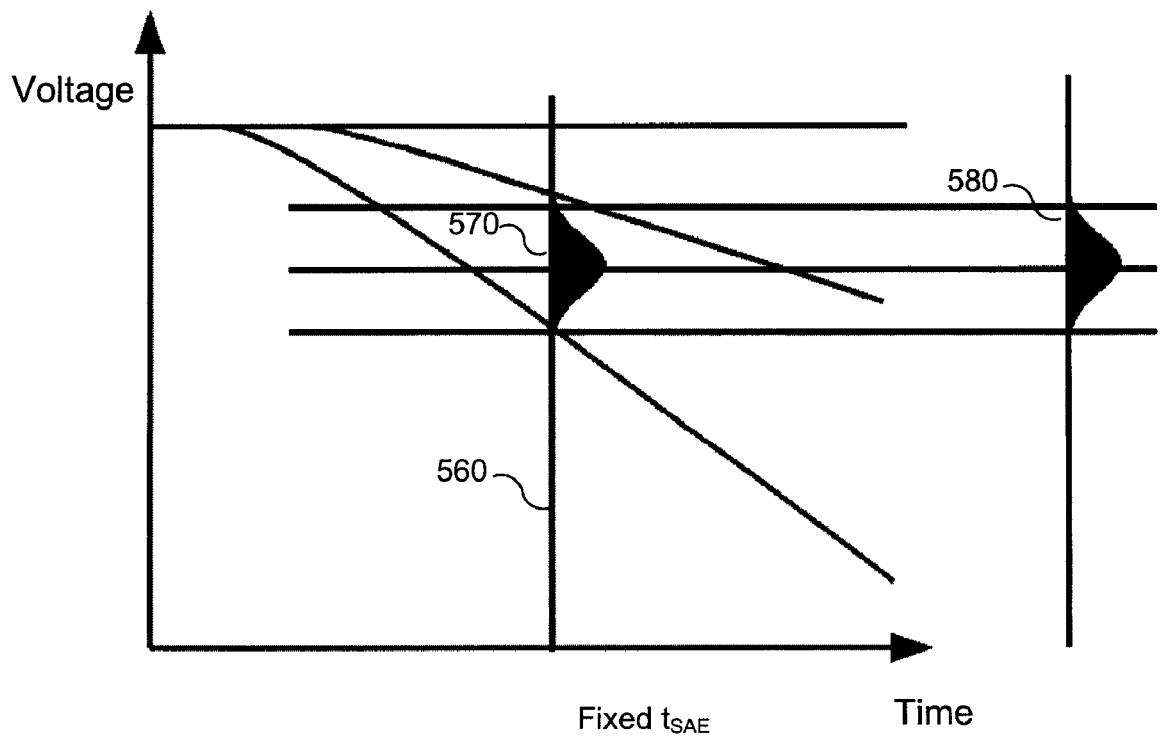

Once the wordline is enabled and the bitline starts to discharge, both the mean and standard deviation of the bitline separation increases. Thus, the accuracy of the tracking scheme can be used to predict the input voltage of the sense amplifier 550. FIG. 5A illustrates an example of a variation sense amplifier enable, $t_{SAE}$, which is a distribution instead of a fixed value. FIG. 5B illustrates an ideal case where $t_{SAE}$ is a fixed value (e.g., always activated at exactly the same time). If $t_{SAE}$ 560 is a fixed value, then the distribution 570 $\Delta V_{BL}$ at $t_{SAE}$ 560 is equal to the input voltage of the sense amplifier 580 and then there is no skewed Gaussian distribution.

Figure 6:
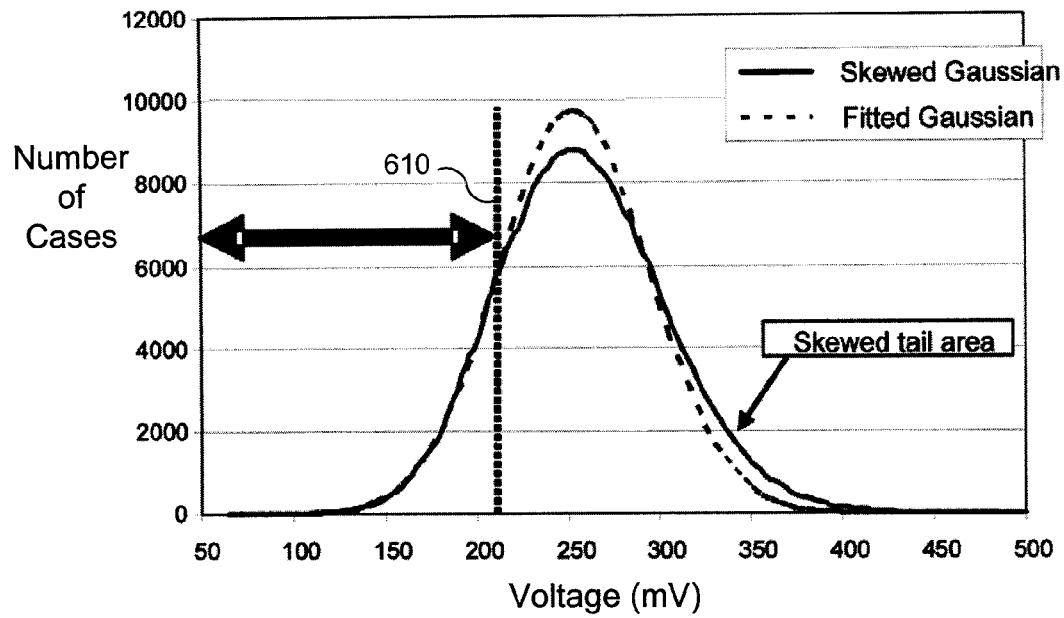
FIG. 6 is a graph illustrating the skewed Gaussian fitting of the bitline separation.

FIG. 6 is a graph illustrating a comparison of the skewed Gaussian distribution versus a fitted Gaussian distribution of bitline separation ($\Delta V_{BL}$). The $\Delta V_{BL}$ distribution and the fitted Gaussian distribution, $N_V$(253.4 mV, 40.9 mV), when $N_{t_{SAE}}$(1 ns, 100 ps) is applied is illustrated. The $\Delta V_{BL}$ skewed Gaussian distribution only fits a partial curve from 0 to the 1-sigma point 610, which is a point 1 sigma less than the mean value of the fitted Gaussian distribution. Accordingly, embodiments of the invention provide accurate and simple fitting to the worst case tail end of the skewed Gaussian curve because the slope changes polarity at the 1-sigma point. A normalization process is unnecessary because the ratio of the fitted area to the overall area in both cases match with less than 2% error (see, e.g., Table 1). This validates the fitted Gaussian distribution in the worst case tail region.

TABLE 1

Gaussian fitting result and error percentage with different SAE std

| Fitted Gaussian | Standard deviation at the SAE signal (ps) | | | | | | | | |
|---|---|---|---|---|---|---|---|---|---|
| | 0 | 20 | 40 | 60 | 80 | 100 | 150 | 200 | 300 |
| Mean (mV) | 257.8 | 257.6 | 257.0 | 255.3 | 254.9 | 253.4 | 251.7 | 250.0 | 248.2 |
| Std (mV) | 36.7 | 37.0 | 37.3 | 37.6 | 39.1 | 40.9 | 48.5 | 56.9 | 78.1 |
| Error (%) | 0.3 | 1.9 | 0.4 | 1.9 | 0.3 | 0.7 | 1.5 | 1.3 | 0.4 |

Equation (4) combines the distributions of $\Delta V_{BL}$ and $t_{SAE}$. To further determine the system credibility, embodiments of the invention combine the distributions of $\Delta V_{BL}$ and sense amplifier offset voltage $V_{OS\_SA}$. Regarding the combined distributions of $\Delta V_{BL}$ (or sense amplifier input voltage ($\Delta V_{BL}$)) and $V_{OS\_SA}$, the following are observations:

(i) If $\Delta V_{BL} > V_{OS\_SA}$, read operation is a success.
(ii) The addition of two Gaussian distributions generates a Gaussian distribution with a variance equal to the sum of two variances from the two initial distributions.
(iii) Both tails in $V_{OS\_SA}$ should be considered because each side is responsible for reading "1" or "0".

Since the variations in $V_{OS\_SA}$ and $\Delta V_{BL}$ due to device threshold fluctuations are independent, the target overall standard deviation, $\sigma_{V_{overall}}$, can be represented by the following equation.

$$\sigma^2_{OS\_SA} + \sigma^2_{\Delta V_{BL}} = \sigma^2_{V_{overall}} \quad (5)$$

If z-σ credibility is to be used for the analyzed (e.g., critical) path, x-σ can be assigned to the $V_{OS\_SA}$ and y-σ to the $\Delta V_{BL}$ such that $x^2 + y^2 = z^2$. In addition, y-σ of $\Delta V_{BL}$ should be larger than x-σ of $V_{OS\_SA}$ to ensure bitline separation is larger than the sensing margin in the analyzed path. For example, z is ~5 sigma to achieve a targeted yield (see, e.g., FIG. 2), then one solution would be to have $\Delta V_{BL}$ be ~4 sigma and $V_{OS\_SA}$ ~3 sigma.

Figure 7:
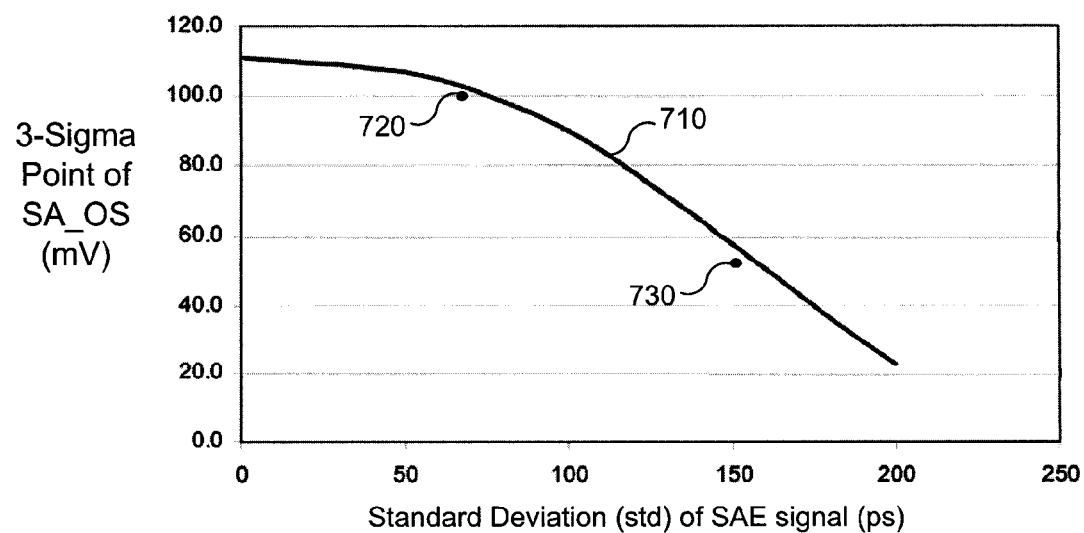
FIG. 7 is a graph illustrating a design tradeoff between the sense amplifier offset voltage and tracking scheme design for specific mean discharge time.

Accordingly, embodiments of the invention can provide design margin guidelines for process variation tolerant memory. For example using Table 1, design margin guidelines for the bitline tracking scheme, the read access time, and the sense amplifier (SA) design can be established. FIG. 7 is a graph illustrating an example of a design tradeoff between SA and tracking scheme design when targeting a 5-sigma read access failure, assuming a 1 ns mean discharge time of the bitline. For the given tracking scheme standard deviation, as long as the 3-sigma point of SA offset stays below curve 710 it satisfies a 5-sigma yield. For example, referring to 720, if the standard deviation is small for the sense amplifier enable (SAE) signal (e.g., ~75 ps) then the 3-sigma point of SA offset can be increased (e.g., ~100 mV). However, referring to 730, if the standard deviation is greater for SAE signal (e.g., ~150 ps) then the 3-sigma point of SA offset is decreased (e.g., ~50 mV).

In case both the standard deviation of the sense amplifier enable (SAE) signal and 3-sigma point of the SA offset are small, the nominal discharge time can be reduced or a different array architecture, such as changing the number of cells on a bitline, can be considered. In either case, a new simulation would be run resulting in different values for Table 1 and FIG. 7. Accordingly, embodiments of the invention allow for the impact of various design changes to be simulated and an optimal design tradeoff point to be found.

Figure 8:
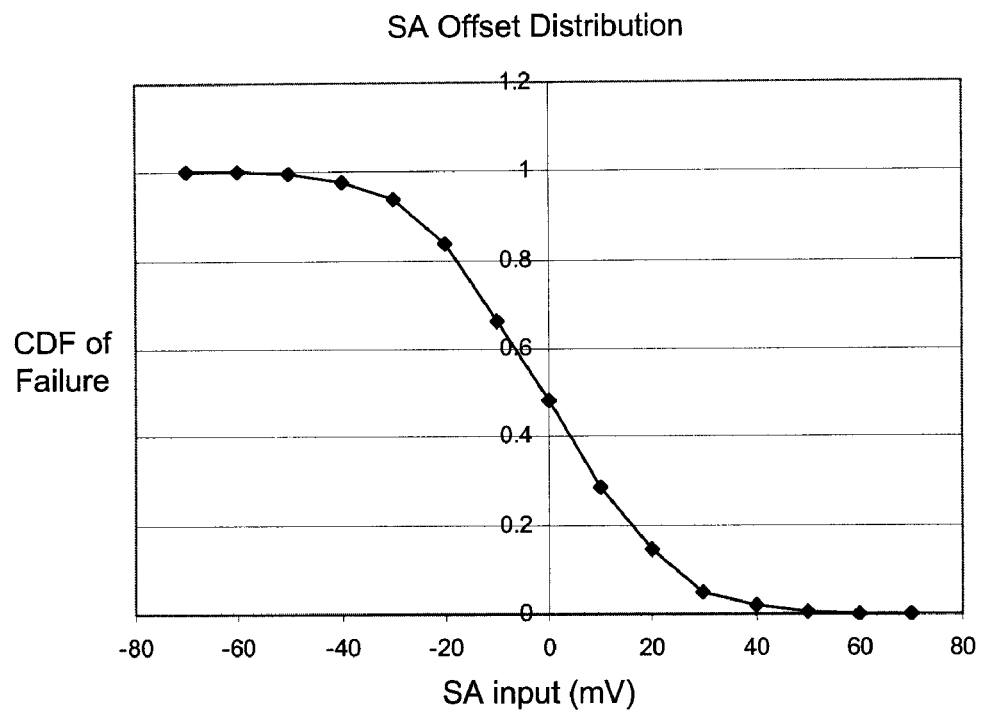
FIG. 8 is a graph illustrating the distribution of the sense amplifier offset.
Figure 9:
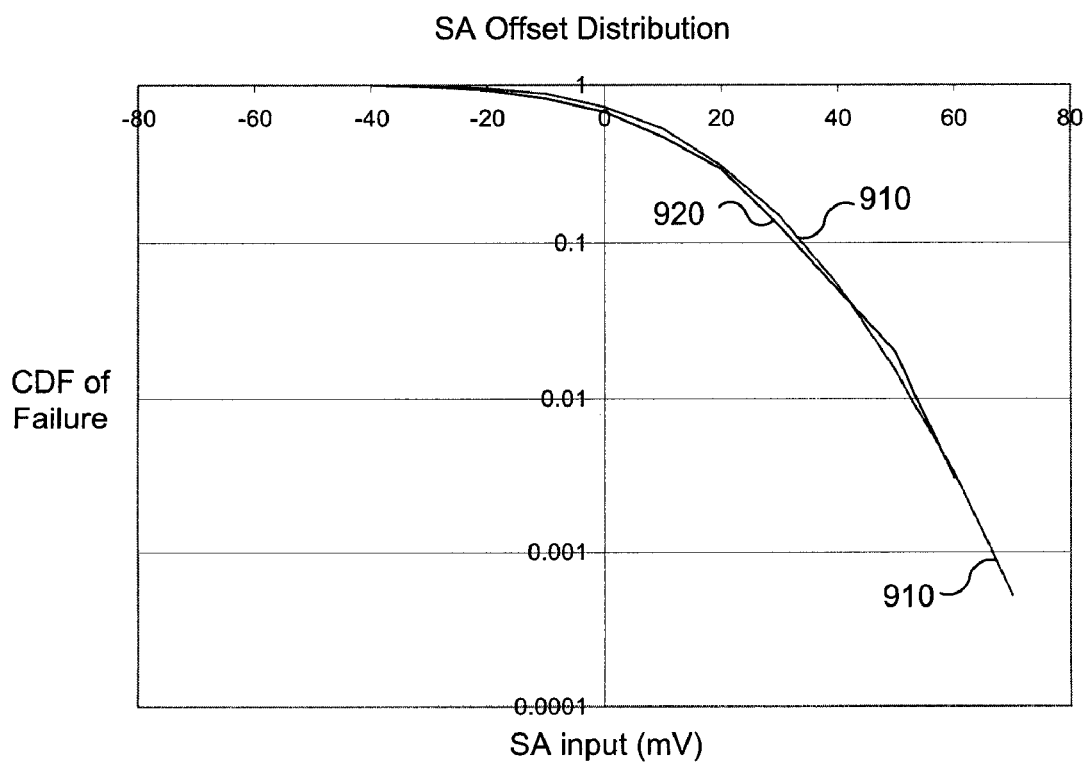
FIG. 9 is a graph illustrating the cumulative distribution function (cdf) of the sense amplifier offset on a logarithmic scale.

A sense amplifier either passes or fails a given input. It is assumed $\Delta V_{BL} > V_{OS\_SA}$ is sufficient to develop a correct answer. The distribution of $V_{OS\_SA}$ can be obtained by using multiple independently generated (or equivalently, Monte Carlo iterated) sense amplifiers and checking how many of them failed for the given fixed input. For example, in the ideal case, a near zero voltage difference will lead to ~50% failure rate. Accordingly, increasing the voltage difference between BL & BLb ($\Delta V_{BL}$) can reduce the chance of failure. FIG. 8 is a graph illustrating a distribution of $V_{OS\_SA}$. The graph can be generated by applying an input voltage on the x-axis to one thousand independently generated sense amplifiers, which can be generated by Monte Carlo iterations. Due to the nature of the simulation, the results are obtained in a cumulative form. Conversion of the cumulative distribution function (cdf) to a probability density function (pdf) is not complicated, but it is also not necessary in embodiments of the invention. FIG. 9 is a graph illustrating the distribution of $V_{OS\_SA}$ on a logarithmic scale so the details are more clearly observed. Curve 910 is a fitted curve for $V_{OS\_SA}$ and curve 920 are the actual values from the simulation.

Assuming a 5-sigma credibility is desired for the analyzed (critical) path, 3-sigma can be assigned to $V_{OS\_SA}$ and 4-sigma to $\Delta V_{BL}$. Then, the following equation should be true to guarantee $\alpha_{overall} > 5$ sigma yield.

$$|3\text{-sigma point of } V_{OS\_SA} \text{ of reading "1"(or "0")}| < |4\text{-sigma point of } \Delta V_{BL} \text{ for input "1"(or "0")}|. \quad (6)$$

The reason for taking the magnitude is because there exists two 3-sigma points in $V_{OS\_SA}$ and one of them is most likely to be negative. Note that there are two cases to compare—one for read "0" and the other for read "1". Ideally the mean of $V_{OS\_SA}$ should be zero. Therefore, it shouldn't matter which case you compare. However, the mean of $V_{OS\_SA}$ may be a positive or negative value which may result in one case having a greater magnitude.

Figure 10:
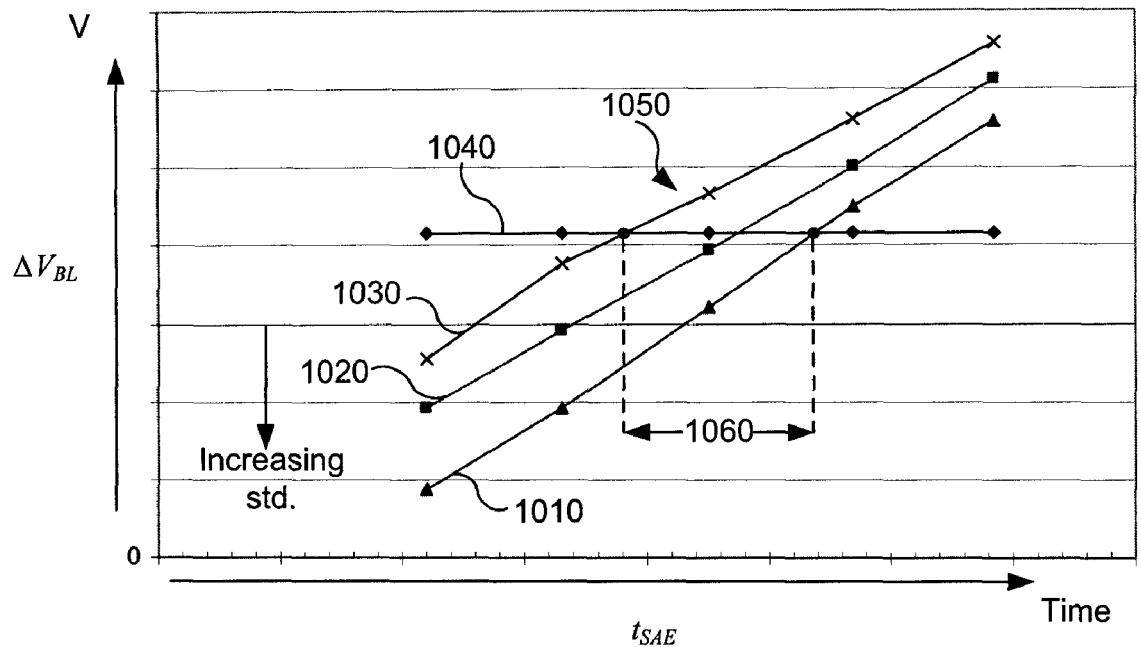
FIG. 10 is a graph illustrating a comparison of the 3-sigma point of the sense amplifier offset and the 4-sigma of the sense amplifier input.

FIG. 10 is a graph illustrating a relationship between 3-sigma points 1040 of $V_{OS\_SA}$ and 4-sigma points (1010, 1020 and 1030) of $\Delta V_{BL}$ as the mean discharge time increases (i.e., the time until the sense amplifier is enabled ($t_{SAE}$)). Note, that the standard deviation of 1010>1020>1030, that is the standard deviation increases for descending lines in FIG. 10. In order to satisfy 5-sigma credibility, the 4-sigma points (1010, 1020 and 1030) should stay above the 3-sigma values (i.e., 1050), which can be achieved through several methods, as will be appreciated by those skilled in the art. For example, the following may be considered.

(i) Increase the mean discharge time.
(ii) Reduce the standard deviation of $V_{OS\_SA}$. If the timing constraint is tight and increasing the discharge time is impossible, redesign the sense amplifier so that its 3-sigma point of $V_{OS\_SA}$ is below the 4-sigma point of $\Delta V_{BL}$.
(iii) Modify the tracking scheme so that the standard deviation of $t_{SAE}$ can be reduced. FIG. 10 shows a reduction of standard deviation (e.g., from 1010 to 1030) can reduce the needed discharge time by a significant percentage of the total discharge time (see, e.g., 1060).

As process technology scales down, process variations, which are getting worse in smaller dimensions, have become one of the most challenging issues in memory design since bitcells use the smallest transistors for high integration and sense amplifiers are vulnerable to threshold voltage mismatches. Embodiments of the invention provide a statistical memory design methodology to achieve a desired yield for memory read access without excessively conservative circuit design. Three components (bitcell, tracking scheme, and sense amplifer) that contribute to the read access failure are simulated separately and the statistical simulation results are combined to estimate the overall read access failure. If the desired yield is not met, access time increase, a larger sense amplifier, and the tracking scheme can be modified and the detailed requirements for modification can be determined and evaluated by embodiments of the invention. Accordingly, embodiments of the invention provide great flexibility and adaptability in early design stages to optimize memory design.

Figure 11:
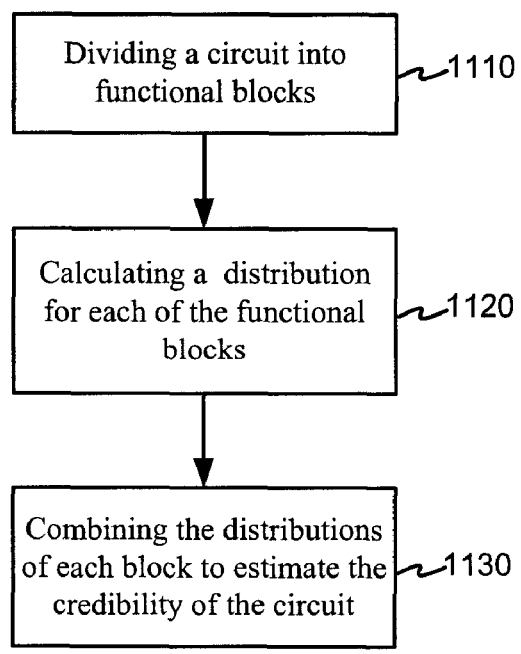
FIG. 11 is a flowchart illustrating a method for designing process variation tolerant memory.

Those skilled in the art will appreciate that embodiments of the invention can include methods for performing the processes, sequence of actions, functions and/or algorithms described in connection with the embodiments disclosed herein. For example, FIG. 11 is a flowchart illustrating an embodiment of the invention. The method can begin by dividing a circuit into functional blocks, 1110. For example, as discussed above, the functional blocks can include a wordline to bitline separation path, a bitline tracking path and/or a sense amplifier. A distribution for each of the functional blocks can be calculated, 1120. For example, as discussed above, the distributions can include a bitline separation voltage distribution; a tracking path delay distribution; and/or a sense amplifier offset distribution. The statistical distribution can be based on process variation parameters, including inter-die and intra-die process variations. Then, the distributions of each block can be combined to verify the credibility of the circuit, 1130. As discussed herein, the credibility of the circuit is verified if the circuit meets a desired yield (see, e.g., FIG. 2 and Eq. 5).

Figure 12:
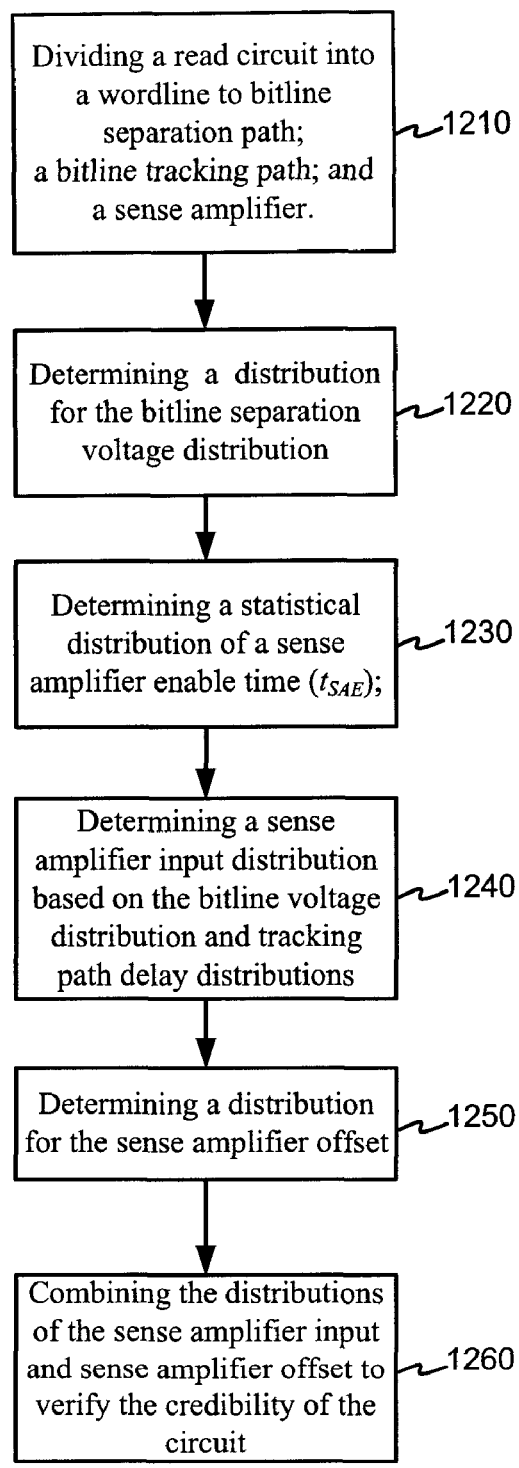
FIG. 12 is a flowchart illustrating a method for designing process variation tolerant memory.

FIG. 12 illustrates a more detailed flowchart of functions in accordance with at least one embodiment of the invention. For example, in block 1210, a read circuit of a memory to be analyzed can be divided into functional blocks including wordline to bitline separation path, a bitline tracking path and a sense amplifier. Statistical distributions of a bitline voltage separation, 1220, and of a sense amplifier enable time (e.g., $t_{SAE}$), 1230 can then be determined. A sense amplifier input voltage distribution ($\Delta V_{BL}$) can then be determined based on the bitline separation voltage and the sense amplifier enable time distributions, 1240. For example, the bitline separation voltage can be modeled as a Gaussian distribution that is a function of the sense enable time (see, e.g., FIGS. 4 and 5A and Eq. 4). The combined distribution of the bitline separation voltage and the sense enable time will result in the distribution of the sense amplifier voltage input, which is the distribution of the bitline separation voltage ($\Delta V_{BL}$) from Eq. 4, which includes the sense enable distribution.

In block 1250, a distribution for the sense amplifier offset can be determined. Then, in block 1260, the sense amplifier input voltage distribution ($\Delta V_{BL}$) can be combined with the distribution of a sense amplifier offset voltage ($V_{OS\_SA}$) to verify the credibility of the circuit (see, e.g., Eq. 5). As discussed above, the sense amplifier offset distribution ($V_{OS\_SA}$) can be determined by generating multiple sense amplifier models and determining a number of generated sense amplifiers that fail for a given input voltage. As will be appreciated by those skilled in the art, the offset distribution will be a function of the process variation parameters and the actual design of the sense amplifier. However, since the sense amplifier design will be the same for a given memory circuit analyzed the distribution will be a function of the process variation.

Accordingly, the process variation impact on the circuit design can be modeled for each functional block. The statistical distributions for each block can be determined and their distributions can be combined to determine the overall credibility of the circuit design for a given process. Further, embodiments of the invention allow for modified memory designs to be reconsidered in the event a circuit design does not meet the desired yield. For example, at least one component of on of the functional blocks can be modified to generate a new circuit design, if the credibility is not verified. The statistical distributions for each of the functional blocks or the block modified can be recalculated. The recalculated statistical distributions of each block can then be combined to verify the credibility of the new circuit design.

Further, those of skill in the art will appreciate that the various illustrative logical blocks, sequence of actions, functions and/or algorithms described in connection with the embodiments disclosed herein may be implemented as electronic hardware, computer software, or combinations of both. To clearly illustrate this interchangeability of hardware and software, various illustrative components have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium can be coupled to a processor such that the processor can read information from, and write information to, the storage medium. In the alternative, the storage medium may be integral to the processor.

Accordingly, an embodiment of the invention can include a computer readable media embodying a method for designing process variation tolerant memory including dividing a circuit into functional blocks, determining a statistical distribution for each of the functional blocks, and combining the statistical distributions of each block to verify a credibility of the circuit. Those skilled in the art will appreciate that although not expressly recited herein, embodiments of the invention can include a computer readable media embodying any of the steps, sequence of actions, functions and/or algorithms described herein. Accordingly, the invention is not limited to the illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A non-transitory computer-readable medium comprising code, which, when executed by a processor, causes the processor to perform operations for designing memory, the non-transitory computer-readable medium comprising:
   code for dividing a circuit into functional blocks;
   code for determining a statistical distribution for each of the functional blocks, wherein the statistical distribution is based on process variation parameters,
   code for combining the statistical distributions of each block to verify a credibility of the circuit, wherein the credibility is verified if the circuit meets a predetermined yield
   code for determining a statistical distribution of a bitline separation voltage;
   code for determining a statistical distribution of a sense amplifier enable time ($t_{SAE}$); and
   code for determining a sense amplifier input voltage distribution ($\Delta V_{BL}$) based on the bitline separation voltage distribution and sense amplifier enable time distributions.

2. The non-transitory computer-readable medium of claim 1, wherein the sense amplifier enable time distribution is determined by code for generating random values for a sense amplifier enable time ($t_{SAE}$) that fit the distribution $N_r(\mu_{t_{SAE}}, \sigma_{t_{SAE}}^2)$ where $\mu_{t_{SAE}}$ is a mean value of $t_{SAE}$ and $\sigma_{t_{SAE}}$ is a standard deviation of $t_{SAE}$.

3. The non-transitory computer readable media of claim 2, wherein the sense amplifier input voltage distribution ($\Delta V_{BL}$) is determined as:

$$\Delta V_{BL} \sim N_r[\mu_{\Delta V_{BL}}\{N_r(\mu_{t_{SAE}}, \sigma_{t_{SAE}}^2)\}, \sigma_{66\,V_{BL}}^2\{N_r(\mu_{t_{SAE}}, \sigma_{t_{SAE}}^2)\}]$$

where $\mu_{\Delta V_{BL}}$ is a mean of the bitline separation voltage and $\sigma_{\Delta V_{BL}}$ a standard deviation of the bitline separation voltage and wherein $\mu_{\Delta V_{BL}}$ and $\sigma_{\Delta V_{BL}}$ vary as a function of $t_{SAE}$.

4. The non-transitory computer-readable medium of claim 1, further comprising:
   code for combining the sense amplifier input voltage distribution and a distribution of a sense amplifier offset voltage ($V_{OS\_SA}$).

5. The non-transitory computer-readable medium of claim 4, wherein the sense amplifier offset distribution ($V_{OS\_SA}$) is determined by:
   code for generating multiple sense amplifier models; and
   code for determining a number of generated sense amplifiers that fail for a given input voltage.

6. An apparatus for designing memory comprising:
   means for dividing a circuit into functional blocks;
   means for determining a statistical distribution for each of the functional blocks, wherein the statistical distribution is based on process variation parameters;

means for combining the statistical distributions of each block to verify a credibility of the circuit, wherein the credibility is verified if the circuit meets a predetermined yield means for determining a statistical distribution of a bitline separation voltage;

means for determining a statistical distribution of a sense amplifier enable time ($t_{SAE}$); and means for determining a sense amplifier input voltage distribution ($\Delta V_{BL}$) based on the bitline separation voltage distribution and sense amplifier enable time distributions.

7. The apparatus of claim 6, wherein the process variation parameters include inter-die and intra-die process variation parameters.

8. The apparatus of claim 6, wherein the circuit is a read circuit of the memory.

9. The apparatus of claim 8, wherein the functional blocks comprise at least one of:
 a word line to bitline separation path;
 a bitline tracking path; or
 a sense amplifier.

10. The apparatus of claim 8, wherein the statistical distribution of one of the functional blocks comprises at least one of:
 a bitline separation voltage distribution;
 a tracking path delay distribution; or
 a sense amplifier offset distribution.

11. The apparatus of claim 6, wherein the apparatus is a processor.

12. The apparatus of claim 6, wherein the sense amplifier enable time distribution is modeled as a Gaussian distribution.

13. The apparatus of claim 12, wherein the sense amplifier enable time distribution is determined by generating random values for a sense amplifier enable time ($t_{SAE}$) that fit the distribution $N_t(\mu_{t_{SAE}}, \sigma_{t_{SAE}}^2)$ where $\mu_{t_{SAE}}$ is a mean value of $t_{SAE}$ and $\sigma_{t_{SAE}}$ is a standard deviation of $t_{SAE}$.

14. The apparatus of claim 13, wherein the sense amplifier input voltage distribution ($\Delta V_{BL}$) is determined as:

$$\Delta V_{BL} \sim N_V[\mu_{\Delta V_{BL}}\{N_t(\mu_{t_{SAE}}, \sigma_{t_{SAE}}^2)\}, \sigma_{66\,V_{BL}}^2\{N_t(\mu_{t_{SAE}}, \sigma_{t_{SAE}}^2)\}]$$

where $\mu_{\Delta V_{BL}}$ is a mean of the bitline separation voltage and $\sigma_{\Delta V_{BL}}$ a standard deviation of the bitline separation voltage and wherein $\mu_{\Delta V_{BL}}$ and $\sigma_{\Delta V_{BL}}$ vary as a function of $t_{SAE}$.

15. The apparatus of claim 6, further comprising:
 means for combining the sense amplifier input voltage distribution and a distribution of a sense amplifier offset voltage ($V_{OS\_SA}$).

16. The apparatus of claim 15, wherein the sense amplifier offset distribution ($V_{OS\_SA}$) is determined by:
 means for generating multiple sense amplifier models; and
 means for determining a number of generated sense amplifiers that fail for a given input voltage.

17. The apparatus of claim 16, wherein the multiple sense amplifier models are generated by Monte Carlo iterations using the process variation parameters.

18. The apparatus of claim 6, further comprising:
 means for modifying at least one component of at least one functional block to generate a new circuit design, if the credibility is not verified;
 means for recalculating a statistical distribution for the at least one modified functional block; and
 means for combining the statistical distributions of each block to verify a credibility of the new circuit design, wherein the credibility is verified if the new circuit design meets the predetermined yield.

19. The apparatus of claim 6, wherein the memory is static random access memory (SRAM) memory.

* * * * *